(No Model.)

A. B. SHANTS.
POTATO DIGGER.

No. 380,771. Patented Apr. 10, 1888.

Witnesses
James MacGregor
George Sanderson, Jr.

Inventor.
Abram B. Shants,
per Frederick W. Cameron.
His Attorney.

United States Patent Office.

ABRAM B. SHANTS, OF SLITERS, NEW YORK.

POTATO-DIGGER.

SPECIFICATION forming part of Letters Patent No. 380,771, dated April 10, 1888.

Application filed October 24, 1887. Serial No. 253,275. (No model.)

*To all whom it may concern:*

Be it known that I, ABRAM B. SHANTS, a citizen of the United States, residing at Sliters, in the county of Rensselaer and State of New York, have invented a new and useful Potato-Digger, of which the following is a specification.

My invention relates to improvements in machines for digging potatoes; and the object of my invention is to produce a machine that will dig the potatoes out of the ground, separate them from the soil that surrounds them, and leave them on top of the earth, ready to be picked up and put into baskets or barrels. I attain this object by the mechanism illustrated in the accompanying drawings, in which—

Figure 1:
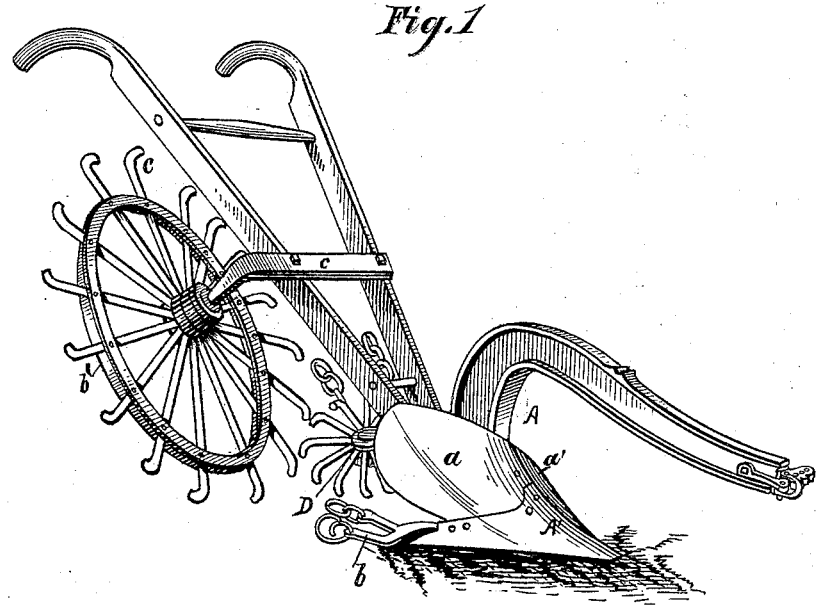
Figure 2:
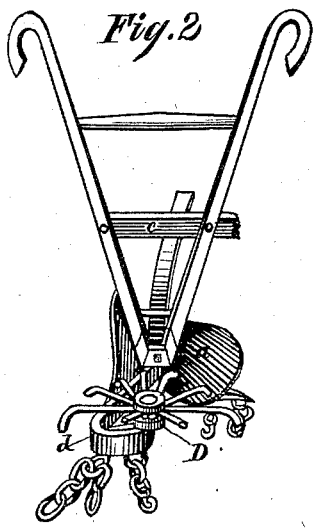

Figure 1 shows my invention ready for use, and Fig. 2 is a detailed view of the sifting-wheel D, showing the manner of its attachment.

Similar letters refer to similar parts throughout the several views.

A represents a plow having its mold-board $a$ cut off or made shorter than is usual in plows, in order that the potatoes and the dirt accompanying them may come into contact with the sifting-wheel D. To the share of the plow I attach by rivet, as shown in the drawings, or in any suitable manner, a strap, $a'$, to assist in throwing the soil, vines, potatoes, &c., to the right. To the end of the share A', farthest from the cutting-edge of the plow, I attach by bolts, as shown in the drawings, or in any suitable manner, a drag, $b$, consisting of two short bars with a link at their ends to assist in carrying the potatoes to the sifting-wheel D.

To the handles of the plow I attach by bolt and thumb-screw the curved axle $c$. The axle $c$ may be moved up or down along the handles of the plow by changing the position of the bolt and thumb-screw as necessity requires. The wheel C revolves on the axle $c$ near the end, extending beyond and at the right of the handles. The wheel C has a number of spokes, usually constructed of steel, bent slightly at the end farthest from the hub, and retained steadily in their position by a band, $b'$, attached to them near their ends.

At the junction of the handles of the plow is attached by means of a bolt the arm $d$. (See Fig. 2.) The arm $d$ is also attached by bolt to the left side of the plow, and carries on its end formed to receive it the sifting-wheel D. The sifting-wheel D is provided with a series of spokes, usually made of steel, with their ends farthest from the hub bent downwardly, revolving freely upon the end of the arm $d$. The arm $d$ is placed at an angle, in order that the sifting-wheel D will not revolve in a horizontal plane, but will incline slightly downward toward the wheel C.

To operate my machine I attach a horse to it and place the nose of the plow just to the left of a row of potato-hills, in such a position that the share of the plow will dig right under and through the hill, throwing the dirt, vines, potatoes, and stones toward the right, which will come into contact with the guide-wheel C, which will cause it to revolve and throw part of the dirt and potatoes onto the sifting-wheel, the spokes of which have their ends on the lower side in contact with the earth, and thus it is caused to revolve, and the dirt thrown upon it will sift through between the spokes, while the potatoes, being too large to pass between the spokes, will be left on top of the ground in rear of the wheel D.

The axle $c$ is curved in such a manner that the guide-wheel C, revolving upon it, will not move in a vertical plane, but will have its lower edge very near the sifting-wheel D, while its upper edge inclines away from the handles of the plow. Thus when the dirt and vines are thrown against it a great part of the dirt will pass between the spokes, while the heavier portions of the material which come in contact with it, including the potatoes, which would naturally strike the spokes near their lower extremities, will be guided onto the sifting-wheel D.

My machine is simple in its construction. Any plow may be with little expense made into a potato-digger. It performs its work satisfactorily.

What I claim as new, and desire to secure by Letters Patent, is—

1. In a potato-digger, the combination of the plow A, with the guide-wheel C, revolving on the axle $c$, attached to the handles of the plow, and with the sifting-wheel D, revolving on the arm $d$, all substantially as described, and for the purposes set forth.

2. In a potato-digger, the plow A, having attached to the nose of the share A' the strap $a'$, with the drag $b$, attached to the share A' at the end farthest from the nose, with the guide-wheel C, revolving on the axle $c$, and with the sifting-wheel D, revolving on the arm $d$, all substantially as described, and for the purpose set forth.

ABRAM B. SHANTS.

Witnesses:
WALTER E. WARD,
FREDERICK W. CAMERON.